United States Patent
Kamper et al.

(10) Patent No.: US 10,298,494 B2
(45) Date of Patent: May 21, 2019

(54) REDUCING SHORT-PACKET OVERHEAD IN COMPUTER CLUSTERS

(71) Applicant: Strato Scale Ltd., Herzlia (IL)

(72) Inventors: Liaz Kamper, Ra'anana (IL); Vadim Suraev, Ariel (IL)

(73) Assignee: Strato Scale Ltd., Herzliya (IL)

( * ) Notice: Subject to any disclaimer, the term of this patent is extended or adjusted under 35 U.S.C. 154(b) by 768 days.

(21) Appl. No.: 14/936,712

(22) Filed: Nov. 10, 2015

(65) Prior Publication Data

US 2016/0142307 A1   May 19, 2016

Related U.S. Application Data

(63) Continuation of application No. PCT/IB2015/058524, filed on Nov. 4, 2015.
(Continued)

(51) Int. Cl.
*H04L 12/741* (2013.01)
*H04L 12/911* (2013.01)
(Continued)

(52) U.S. Cl.
CPC .......... *H04L 45/74* (2013.01); *H04L 12/4633* (2013.01); *H04L 47/50* (2013.01);
(Continued)

(58) Field of Classification Search
None
See application file for complete search history.

(56) References Cited

U.S. PATENT DOCUMENTS

| | | | |
|---|---|---|---|
| 6,473,425 B1 * | 10/2002 | Bellaton | H04L 29/06 370/392 |
| 2003/0026209 A1 * | 2/2003 | Katz | H04L 12/42 370/238 |

(Continued)

FOREIGN PATENT DOCUMENTS

| | | |
|---|---|---|
| EP | 1104141 A2 | 5/2001 |
| EP | 0912028 B1 | 3/2006 |

OTHER PUBLICATIONS

International Application # PCT/IB2015/058524 Search Report dated Feb. 21, 2016.

(Continued)

*Primary Examiner* — Angela Nguyen
(74) *Attorney, Agent, or Firm* — Kligler & Associates

(57) ABSTRACT

A method includes, in a computing system that includes multiple compute nodes that run workloads and are connected by a network, establishing a dedicated Transport Control Protocol (TCP) connection over the network between a first compute node and a second compute node. Packets, which originate from one or more source workloads on the first compute node and are destined to one or more destination workloads on the second compute node, are identified and queued in the first compute node. The queued packets are aggregated in the first compute node into one or more TCP segments, and the TCP segments are sent over the dedicated TCP connection to the second compute node. In the second compute node, the TCP segments are received over the dedicated TCP connection, the packets are extracted from the received TCP segments, and the extracted packets are forwarded to the destination workloads.

15 Claims, 3 Drawing Sheets

Related U.S. Application Data

(60) Provisional application No. 62/081,593, filed on Nov. 19, 2014.

(51) Int. Cl.
*H04L 12/863* (2013.01)
*H04L 12/46* (2006.01)
*H04L 29/06* (2006.01)
*H04L 29/08* (2006.01)

(52) U.S. Cl.
CPC ............ *H04L 47/70* (2013.01); *H04L 69/166* (2013.01); *H04L 67/2861* (2013.01)

(56) References Cited

U.S. PATENT DOCUMENTS

| | | |
|---|---|---|
| 2005/0041688 A1 | 2/2005 | Bernhard et al. |
| 2007/0014245 A1 | 1/2007 | Aloni et al. |
| 2011/0271008 A1 | 11/2011 | An et al. |
| 2012/0005369 A1 | 1/2012 | Capone et al. |
| 2013/0343182 A1 | 12/2013 | Hassan et al. |
| 2015/0281086 A1* | 10/2015 | Matsuoka ............. H04L 47/122 370/235 |
| 2016/0080207 A1* | 3/2016 | Prakash ................. H04L 69/16 370/231 |

OTHER PUBLICATIONS

Infiniband Trade Association, "Infiniband Architecture Specification", vol. 1, release 1.2.1, Annex A10, pp. 1650-1697, Nov. 2007.
VMware, Inc, "Virtualization Essentials", 10 pages, 2014.

* cited by examiner

REDUCING SHORT-PACKET OVERHEAD IN COMPUTER CLUSTERS

CROSS-REFERENCE TO RELATED APPLICATIONS

This application claims the benefit of U.S. Provisional Patent Application 62/081,593, filed Nov. 19, 2014. This application is a continuation of PCT Application PCT/IB2015/058524, filed Nov. 4, 2015. The disclosures of these related applications are incorporated herein by reference.

FIELD OF THE INVENTION

The present invention relates generally to computing systems, and particularly to methods and systems for efficient communication between computer-system nodes.

BACKGROUND OF THE INVENTION

Machine virtualization is commonly used in various computing environments, such as in data centers and cloud computing. Various virtualization solutions are known in the art. For example, VMware, Inc. (Palo Alto, Calif.), offers virtualization software for environments such as data centers, cloud computing, personal desktop and mobile computing.

SUMMARY OF THE INVENTION

An embodiment of the present invention that is described herein provides a method including, in a computing system that includes multiple compute nodes that run workloads and are connected by a network, establishing a dedicated Transport Control Protocol (TCP) connection over the network between a first compute node and a second compute node. Packets, which originate from one or more source workloads on the first compute node and are destined to one or more destination workloads on the second compute node, are identified and queued in the first compute node. The queued packets are aggregated in the first compute node into one or more TCP segments, and the TCP segments are sent over the dedicated TCP connection to the second compute node. In the second compute node, the TCP segments are received over the dedicated TCP connection, the packets are extracted from the received TCP segments, and the extracted packets are forwarded to the destination workloads.

In some embodiments, aggregating the queued packets includes generating a TCP segment that jointly encapsulates at least two packets that are destined to different destination workloads on the second compute node. In an embodiment, aggregation of the queued packets into the TCP segments is performed by a Central Processing Unit (CPU) of the first compute node. In another embodiment, aggregation of the queued packets into the TCP segments is performed by a Network Interface Controller (NIC) in the first compute node, while offloading a Central Processing Unit (CPU) of the first compute node.

In some embodiments, aggregating the queued packets includes deciding to terminate aggregation of the packets into a current TCP segment, by evaluating a predefined criterion. In an example embodiment, deciding to terminate the aggregation includes constraining a maximum delay incurred by queuing the packets. In another embodiment, deciding to terminate the aggregation includes constraining a maximum total data volume of the queued packets.

In a disclosed embodiment, identifying the packets destined to the second compute node includes querying a mapping that maps Medium Access Control (MAC) addresses to compute-node identifiers. Querying the mapping may include extracting destination MAC addresses from the packets generated in the first compute node, and selecting, using the mapping, the packets whose destination MAC addresses are mapped to a compute-node identifier of the second compute node.

In yet another embodiment, queuing the packets includes identifying an Address Resolution Protocol (ARP) packet that duplicates another ARP packet that is already queued, and discarding the identified ARP packet. In still another embodiment, queuing the packets includes identifying a TCP packet that is a retransmission of another TCP packet that is already queued, and discarding the identified TCP packet. In an example embodiment, aggregating the queued packets includes, in response to identifying a TCP packet that is a retransmission of another TCP packet that is already queued, terminating aggregation of the packets into a current TCP segment and sending the current TCP segment to the second compute node.

In some embodiments, aggregating the queued packets in the first compute node includes, in response to identifying among the packets at least a predefined number of duplicate TCP acknowledgements belonging to a same TCP connection, terminating aggregation of the packets into a current TCP segment. In an embodiment, extracting the packets in the second compute node includes, in response to identifying among the packets at least a predefined number of duplicate TCP acknowledgements belonging to a same TCP connection, delivering the duplicate TCP acknowledgements immediately to a respective destination workload.

There is additionally provided, in accordance with an embodiment of the present invention, a compute node including a Network Interface Controller (NIC) for communicating over a network, and a Central Processing Unit (CPU). The CPU is configured to run one or more source workloads, to establish a dedicated Transport Control Protocol (TCP) connection over the network with a peer compute node, to identify and queue packets that originate from the source workloads and are destined to one or more destination workloads on the peer compute node, and, in conjunction with the NIC, to aggregate the queued packets into one or more TCP segments and send the TCP segments over the dedicated TCP connection to the peer compute node.

There is further provided, in accordance with an embodiment of the present invention, a compute node including a Network Interface Controller (NIC) for communicating over a network, and a Central Processing Unit (CPU). The CPU is configured to run one or more destination workloads, to establish a dedicated Transport Control Protocol (TCP) connection over the network with a peer compute node, to receive via the NIC over the dedicated TCP connection one or more TCP segments that encapsulate packets that originate from one or more source workloads on the peer compute node and are destined to the destination workloads, and to forward the packets to the destination workloads.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for communication among Virtual Machines (VMs) that run on different compute nodes in a compute-node cluster. In particular, the disclosed techniques improve the efficiency of transporting short packets over the network connecting the compute nodes.

In some embodiments, dedicated Transport Control Protocol (TCP) connections, also referred to as TCP tunnels, are established between pairs of compute nodes. Each compute node monitors the packets originating from the VMs it hosts. Upon detecting a packet that is destined to a VM on another compute node (referred to as a destination node), the compute node adds the packet to a queue associated with the TCP tunnel leading to this destination node (if such a tunnel exists).

At some point, the compute node encapsulates the pending packets of a given queue in a TCP segment, and sends the TCP segment over the TCP tunnel to the destination node. The destination node receives the TCP segment, extracts the packets encapsulated therein, and forwards each packet to its destination VM.

The individual packets encapsulated in a given TCP segment may be short, and often belong to multiple connections between different VMs. The traffic that is ultimately exchanged over the network, however, is made-up of large TCP segments that are handled efficiently by the network elements and incur little overhead. The disclosed techniques lend themselves to implementation that exploits offloading capabilities of the compute-node Network Interface Controllers (NICs).

Various associated techniques are also described, such as methods for identifying which packet is destined to which compute node, i.e., which packet is to be transported via which TCP tunnel. Methods for detecting and discarding duplicate Address Resolution Protocol (ARP) packets, and methods for efficiently supporting TCP fast retransmission mechanisms between VMs are also described.

System Description

Figure 1:
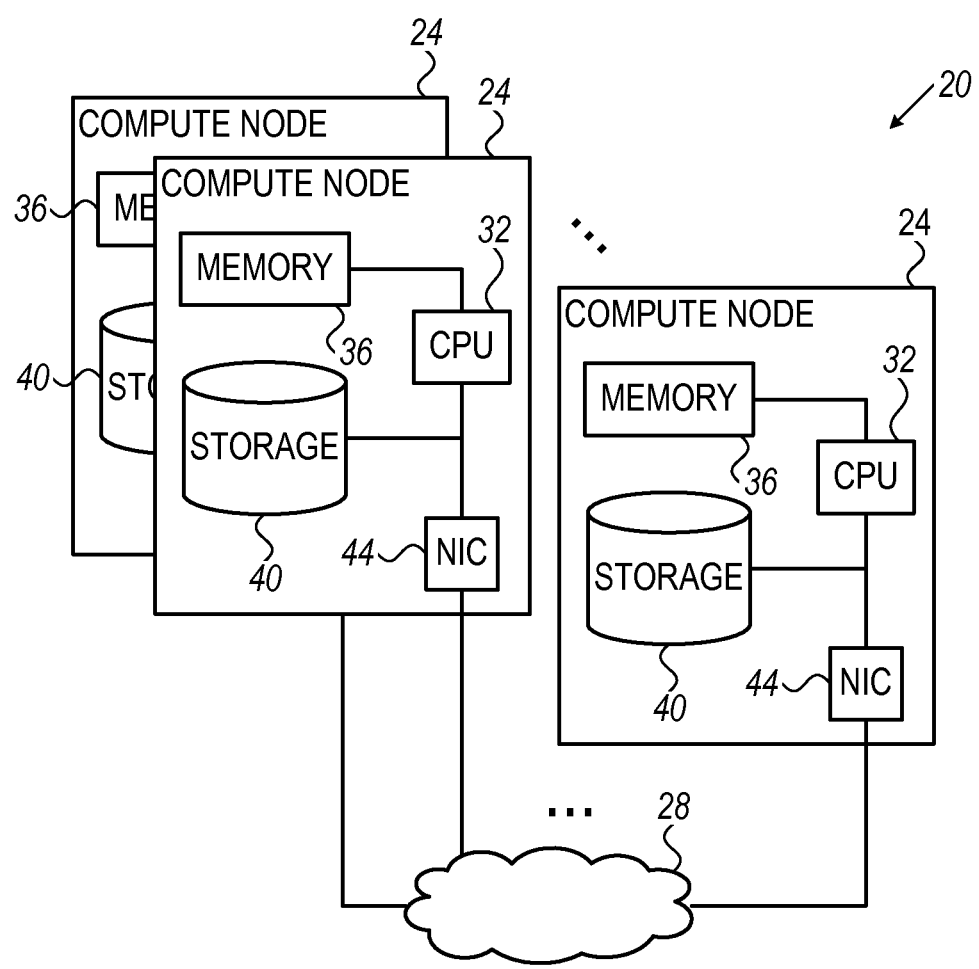
FIG. 1 is a block diagram that schematically illustrates a computing system, in accordance with an embodiment of the present invention.

FIG. 1 is a block diagram that schematically illustrates a computing system 20, which comprises a cluster of multiple compute nodes 24, in accordance with an embodiment of the present invention. System 20 may comprise, for example, a data center, a cloud computing system, a High-Performance Computing (HPC) system or any other suitable system.

Compute nodes 24 (referred to simply as "nodes" for brevity) typically comprise servers, but may alternatively comprise any other suitable type of compute nodes. System 20 may comprise any suitable number of nodes, either of the same type or of different types. Nodes 24 are also referred to as physical machines.

Nodes 24 are connected by a communication network 28, typically a Local Area Network (LAN). Network 28 may operate in accordance with any suitable network protocol, such as Ethernet or Infiniband. In the embodiments described herein, network 28 comprises an Internet Protocol (IP) network.

Each node 24 comprises a Central Processing Unit (CPU) 32. Depending on the type of compute node, CPU 32 may comprise multiple processing cores and/or multiple Integrated Circuits (ICs). Regardless of the specific node configuration, the processing circuitry of the node as a whole is regarded herein as the node CPU. Each node further comprises a memory 36 (typically a volatile memory such as Dynamic Random Access Memory-DRAM) and a Network Interface Card (NIC) 44 for communicating with network 28. In some embodiments a node may comprise two or more NICs that are bonded together, e.g., in order to enable higher bandwidth. This configuration is also regarded herein as an implementation of NIC 44. Some of nodes 24 (but not necessarily all nodes) may comprise one or more non-volatile storage devices 40 (e.g., magnetic Hard Disk Drives—HDDs—or Solid State Drives—SSDs).

The system and compute-node configurations shown in FIG. 1 are example configurations that are chosen purely for the sake of conceptual clarity. In alternative embodiments, any other suitable system and/or node configuration can be used. For example, although the embodiments described herein refer mainly to virtualized data centers, the disclosed techniques can be used for communication between workloads in any other suitable type of computing system.

The various elements of system 20, and in particular the elements of nodes 24, may be implemented using hardware/firmware, such as in one or more Application-Specific Integrated Circuit (ASICs) or Field-Programmable Gate Array (FPGAs). Alternatively, some system or node elements, e.g., elements of CPUs 32, may be implemented in software or using a combination of hardware/firmware and software elements.

Typically, CPUs 32, memories 36, storage devices 40 and NICs 44 are physical, hardware implemented components, and are therefore also referred to as physical CPUs, physical memories, physical storage devices physical disks, and physical NICs, respectively.

In some embodiments, CPUs 32 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Efficient Communication Among VMs on Different Nodes Using Dedicated TCP Tunnels In some embodiments nodes 24 run Virtual Machines (VMs) that, among other tasks, communicate with one another. Although the embodiments described herein refer mainly to communication among VMs, the disclosed techniques can be used for communication among any other suitable types of workloads running on nodes 24, such as applications and/or operating-system processes or containers.

When a VM on a certain node communicates with a VM running on a different node, the communication traffic, typically a flow of packets, traverses network 28. In many practical cases, at least some of these packets are short. Short packets may comprise, for example, authentication request and response packets between a VM that runs an HTTP server and a VM running an authentication service, packets sent due to a small congestion window or advertised window of a TCP connection, Address Resolution Protocol (ARP) packets, and many others. The term "short packet" may be defined in various ways. For example, any packet that is shorter than the maximum Generic Segmentation Offload (GSO) size used by the respective NIC 44 may be regarded as a short packet.

Conventional transfer of short packets over network 28, i.e., naïve packet-by-packet processing, is inefficient and wastes both communication bandwidth and CPU resources. In some embodiments, nodes 24 queue and aggregate packets, and transfer them between nodes over dedicated TCP connections. These techniques are described in detail below.

Figure 2:
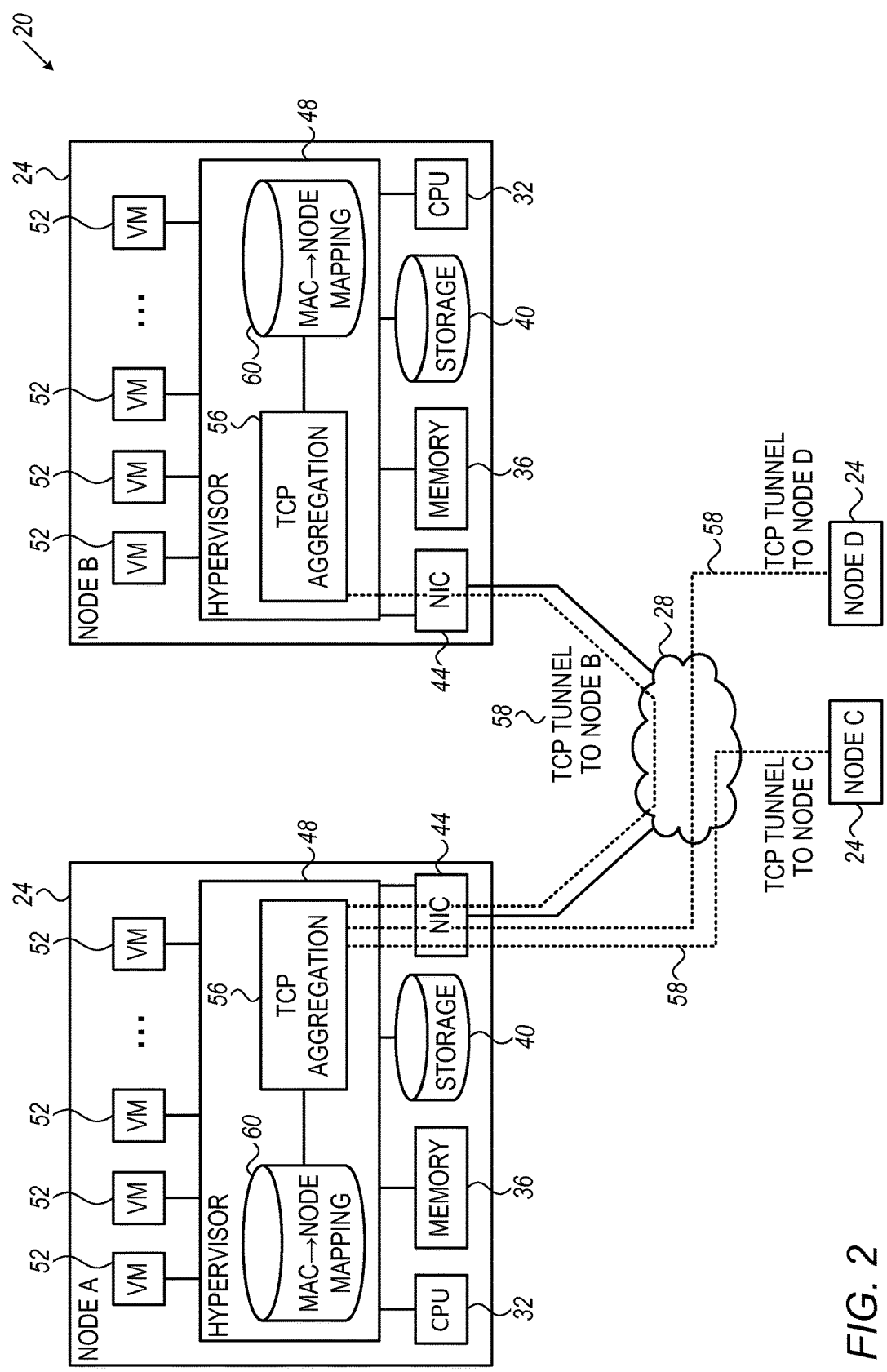
FIG. 2 is a block diagram that schematically illustrates a tunneling scheme used in the computing system of FIG. 1, in accordance with an embodiment of the present invention.

FIG. 2 is a block diagram that schematically illustrates a tunneling scheme used in computing system 20, in accordance with an embodiment of the present invention. The figure shows four nodes 24 denoted NODE A, NODE B, NODE C and NODE D, by way of example. Each node comprises a CPU 32, one or more volatile memory devices (e.g., RAM), one or more non-volatile storage devices (e.g., hard disk drives or solid-state disks), and one or more Network Interface Controllers (NICs) 44.

As noted above, CPUs 32, memories 36, storage devices 40 and NICs 44 are physical, hardware implemented components, and are therefore also referred to as physical CPUs, physical memories, physical storage devices physical disks, and physical NICs, respectively. The internal structure is shown in detail only for NODE A and NODE B, for simplicity. The other compute nodes typically have similar structure.

Each node 24 runs one or more VMs 52. Allocation of physical resources of the node to the VMs (e.g., CPU, volatile memory, non-volatile storage and/or networking resources) is carried out by a hypervisor 48. The hypervisor is typically implemented as a virtualization software component that runs on CPU 32.

In some embodiments of the present invention, hypervisor 48 of each node 24 aggregates and transfers packets that originate from the VMs of that node and are destined to VMs on other nodes 24. Each hypervisor 48 comprises a TCP aggregation module 56 and a MAC-to-node mapping database 60.

Each database 60 holds a mapping between the Medium Access Control (MAC) addresses of the VMs in system 20 and the nodes 24 that host the VMs. In other words, database 60 specifies, for each VM in the system, the MAC address of the VM and the identity of the node 24 on which the VM runs. Database 60 may be stored in any suitable location. In an embodiment, database 60 is extracted from a virtual-switch database that is stored at some centralized location.

Typically, the hypervisor of each node 24 advertises the MAC addresses of the VMs it hosts, and the other hypervisors use this information for constructing their respective databases 60. Advertising may be performed, for example, periodically, upon a change (e.g., upon set-up, migration or tear-down of a VM), or in any other suitable manner.

Each TCP aggregation module 56 establishes one or more dedicated TCP connections 58 to one or more of its peer modules 56 on other nodes 24. TCP connections 58 are also referred to herein as TCP tunnels, and the two terms are used interchangeably. In the present example, module 56 of NODE A has established three TCP tunnels 58 connecting to NODE B, NODE C and NODE D. Generally, however, not every pair of nodes 24 is necessarily connected by a TCP tunnel.

In the present context, the node sending traffic over a TCP tunnel 58 is referred to as a source node, and the node receiving the traffic at the other end of the TCP tunnel is referred to as a destination node. Thus, a given node may serve as a source node for some tunnels and as a destination node for other tunnels.

In addition, each TCP aggregation module 56 maintains one or more outgoing queues per TCP tunnel, i.e., per destination node. In the description that follows, each module 56 maintains one respective outgoing queue per each TCP tunnel (per destination node). Generally, however, a module 56 may maintain several queues for a given tunnel (per destination node), e.g., for queuing packets having different Quality-of-Service (QoS) levels.

Typically, TCP aggregation module 56 in a given source node 24 monitors the packets originating from VMs 52 of that node. In response to detecting a packet destined to a VM on another node, module 56 adds the packet to the queue associated with the tunnel connecting to this destination node (if such a tunnel exists).

For example, module 56 of NODE A queues the packets destined to VMs on NODE B in one queue, the packets destined to VMs on NODE C in another queue, and the packets destined to VMs on NODE C in yet another queue. Module 56 may identify the queue to which a given packet is to be added, for example, by extracting the destination MAC address from the packet, and querying database 60 with this MAC address.

Module 56 aggregates the packets queued in a given queue, so that the node produces one or more TCP segments containing these packets and sends the TCP segments over the respective TCP tunnel 58 to the corresponding destination node. Thus, a given TCP segment may jointly encapsulate multiple packets that are destined to different VMs on the destination node.

In some embodiments, assembly of the TCP segments from the aggregated packets is performed by module 56 in the hypervisor. In other embodiments, module 56 delivers the aggregated packets to NIC 44, and assembly of the TCP segments is performed by the NIC while offloading CPU 32. In either implementation, the source node applies a single encapsulation to multiple packets destined to VMs in a given destination node. As a result, bandwidth overhead and computational complexity (in the CPU or in the NIC) are reduced.

At the destination node, the peer module 56 or the peer NIC 44 extracts the individual packets from the TCP segments received over the TCP tunnel. Module 56 in the hypervisor of the destination node then forwards each packet to its destination VM. In the destination node, too, the fact that multiple packets are received in a given TCP segment reduces overhead and computational complexity.

It is important to note that the individual packets, which modules 56 aggregate and send over TCP tunnels 58, may themselves be TCP packets. To avoid confusion, such individual packets are referred to as "TCP packets" and the aggregated TCP segments produced by modules 56 are referred to as "TCP segments" throughout this patent application.

In some embodiments, module 56 in the source node handles broadcast traffic (e.g., ARP requests) differently than unicast traffic. In an embodiment, upon receiving a broadcast packet, module 56 reference-counts the packet and adds it to the queues of all the dedicated TCP tunnels 58 established in the node. The packet will thus be broadcast over all TCP tunnels.

Figure 3:
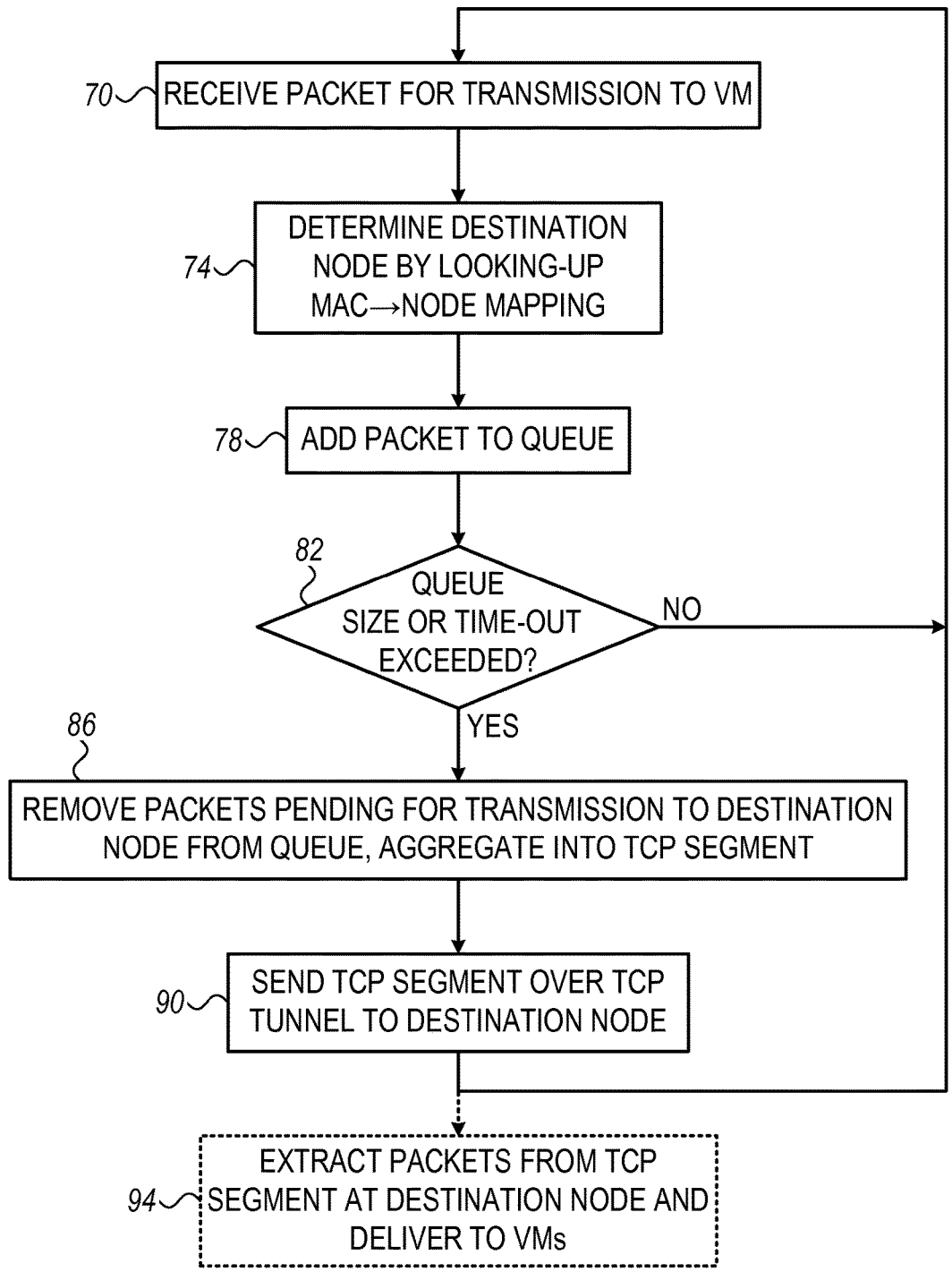
FIG. 3 is a flow chart that schematically illustrates a method for communication among VMs, in accordance with an embodiment of the present invention.

FIG. 3 is a flow chart that schematically illustrates a method for communication among VMs 52, in accordance with an embodiment of the present invention. The method begins with TCP aggregation module 56 in hypervisor 48 of a destination node 24 receiving a packet for transmission, at a packet reception step 70. The packet in question originates from some source VM 52 on the source node and is destined to a certain destination VM 52 on a certain destination node 24.

At a destination identification step 74, module 56 in the source node determines the identity of the destination node of the packet. Typically, module 56 finds the identity of the destination node by extracting the destination MAC address from the packet, and querying the MAC-to-node mapping in database 60 with this MAC address.

If the packet is found to be destined to another VM on the source node (i.e., the destination node is the same as the source node), then the hypervisor forwards the packet to its destination directly, without going out to network 28.

If the destination node is different from the source node, and if a TCP tunnel has been established from the source node to the destination node, module 56 adds the packet to the queue associated with this tunnel, at a queuing step 78.

At a checking step 82, module 56 decides whether the packets pending in the particular queue are to be encapsulated and sent, or whether it should keep waiting for additional packets. In other words, module 56 decides when it is time to terminate the aggregation of packets into the current TCP segment, send it and start aggregating packets into a new TCP segment. The decision may be based on any suitable criterion. For example, encapsulation may be triggered by expiry of a predefined time-out since the oldest packet was added to the queue, so that packets are not delayed by more than a certain delay even if throughput is low. As another example, encapsulation may be triggered if the total volume of data in the queued packets exceeds some predefined threshold. Additional triggering events are suggested further below.

If module 56 decides that the criterion is not yet met, the method loops back to step 70 above. Otherwise, module 56 removes the queued packets from the queue and assembles them into a TCP segment, at an assembly step 86. As noted above, this function may be performed by module 56 or by NIC 44. At a sending step 90, NIC 44 sends the TCP segment over the appropriate TCP tunnel 58 via network 28 to the destination node. The method loops back to step 70 above.

At the destination node, module 56 or NIC 44 extracts the packets from the received TCP segment, and module 56 forwards each packet to its destination VM, at a forwarding step 94.

The method of FIG. 3 is an example method, which is depicted purely for the sake of conceptual clarity. In alternative embodiments, system 20 may implement the disclosed technique using any other suitable method.

Optimizations and Variations

In some embodiments, TCP aggregation modules 56 in hypervisors 48 take various measures for enhancing the efficiency and reducing the latency of the disclosed tunneling process.

For example, in some embodiments a module 56 identifies one or more duplicate Address Resolution Protocol (ARP) packets in a given outgoing queue, and discards them. In an example implementation, module 56 applies a hash function to every ARP packet it intends to add to the queue, and also maintains a list of the hash values of all ARP packets that are currently pending in the queue.

If, when intending to add a new ARP packet to the queue, module 56 finds that the hash value of this packet is identical to a hash value of an already-pending ARP packet, module 56 concludes that the new ARP packet is duplicate and discards it. If the hash value of the new packet is not found on the list, i.e., if no identical ARP packet is already queued, module 56 adds the packet to the queue and adds the hash value to the list.

In some embodiments, module 56 applies a hash function and computes hash values over the TCP headers of the packets that are to be added to the queue. The hash is typically computed over the header fields excluding the TCP options. Module 56 also maintains a list of the hash values of the TCP headers of the packets that are currently pending in the queue.

If, when intending to add a new packet to the queue, module 56 finds that the hash value of the TCP header of this packet is identical to a hash value of the TCP header of an already-pending packet, module 56 concludes that the new packet is a retransmission of a previous packet. In response, module 56 discards the new packet (the retransmission). In addition, module 56 terminates (or instructs NIC 44 to terminate) the aggregation of the current TCP segment, so as to transmit the TCP segment immediately. The rationale behind this technique is that the retransmission may have been caused by some TCP timeout expiry in the source-node TCP stack.

In some embodiments, TCP aggregation modules 56 in the source and destination nodes facilitate the use of the TCP "fast retransmit" mechanism on TCP connections between source VMs (on the source node) and destination VMs (on the destination node). The fast retransmit mechanism is described, for example, in section 3.2 of IETF RFC 5681, entitled "TCP Congestion Control," September, 2009, which is incorporated herein by reference.

Consider, for example, a TCP connection between a source VM on a source node and a destination VM on a destination node. The TCP packets of this connection are aggregated into TCP segments (possibly with other packets originating in the source node and destined to the destination node) by modules 56 and sent over TCP tunnel 58.

The TCP stacks in the source and destination VMs support TCP fast retransmit. The source VM marks each TCP packet in the connection with an incrementing sequence number. The destination VM sends a respective acknowledgement (ACK) in response to each received packet. The ACK indicates the sequence number of the received packet. If the destination VM detects that a packet was lost (by identifying that the next packet has arrived), it acknowledges the next packet but without incrementing the sequence number. As a result, the source VM will receive "duplicate ACKs"—ACKs having the same sequence number. The number of duplicate ACKs, and the sequence number indicated in the duplicate ACKs, indicate to the source VM which packets were lost, and enable the source VM to retransmit the lost packets.

In some embodiments, TCP aggregation module 56 keeps track of the current sequence numbers being used in the various TCP connections transferred over the TCP tunnel. For each TCP connection, module 56 also monitors the TCP ACKs received over the TCP tunnel. Upon detecting a predefined number (e.g., three) duplicate ACKs having the same sequence number, module 56 transfers these ACKs immediately to their destination, so as to enable the VM to trigger fast retransmission.

Additionally or alternatively, module 56 may monitor the TCP ACKs that are queued and pending for transmission over the TCP tunnel. Upon detecting, for a given connection, a predefined number (e.g., three) duplicate ACKs having the same sequence number, module 56 terminates the aggregation and immediately sends the current TCP segment to the destination node. This technique enables the VM at the opposite side of the tunnel to initiate fast retransmit with minimal delay.

Since TCP is a byte-stream protocol, in some embodiments the destination module 56 performs framing when extracting the packets from a received TCP segment. In some embodiments the destination module 56 performs framing using a state machine. In an example embodiment, the state machine has two states:

"Receiving Segment Header" state, in which module 56 receives the header of a TCP segment of the dedicated TCP connection.

"Receiving Packet Data" state, in which module 56 receives the individual packets encapsulated in the TCP segment.

In the "Receiving Segment Header" state, module 56 counts the received bytes so as to determine the total IP packet length (segment length) and the boundary between the segment header and the encapsulated packets. When reaching this boundary, the state machine transitions to the "Receiving Packet Data" state. After a sufficient volume of data is received, the state machine transitions back to the "Receiving Segment Header" state and again looks for total IP packet length. This implementation assumes that each TCP segment is prepended with a header that includes segment metadata (e.g., a 2-byte "total length" field).

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a computing system that includes multiple compute nodes, which run workloads and are connected by a network, establishing a dedicated Transport Control Protocol (TCP) connection over the network between a first compute node and a second compute node;
in the first compute node, identifying and queuing packets that originate from one or more source workloads on the first compute node and are destined to one or more destination workloads on the second compute node;
aggregating the queued packets in the first compute node into one or more TCP segments, and sending the TCP segments over the dedicated TCP connection to the second compute node; and
in the second compute node, receiving the TCP segments over the dedicated TCP connection, extracting the packets from the received TCP segments, and forwarding the extracted packets to the destination workloads,
wherein aggregating the queued packets in the first compute node comprises, in response to identifying among the packets at least a predefined number of duplicate TCP acknowledgements belonging to a same TCP connection, terminating aggregation of the packets into a current TCP segment.

2. The method according to claim 1, wherein aggregating the queued packets comprises generating a TCP segment that jointly encapsulates at least two packets that are destined to different destination workloads on the second compute node.

3. The method according to claim 1, wherein aggregation of the queued packets into the TCP segments is performed by a Central Processing Unit (CPU) of the first compute node.

4. The method according to claim 1, wherein aggregation of the queued packets into the TCP segments is performed by a Network Interface Controller (NIC) in the first compute node, while offloading a Central Processing Unit (CPU) of the first compute node.

5. The method according to claim 1, wherein aggregating the queued packets comprises deciding to terminate aggregation of the packets into a current TCP segment, by evaluating a predefined criterion.

6. The method according to claim 1, wherein identifying the packets destined to the second compute node comprises querying a mapping that maps Medium Access Control (MAC) addresses to compute-node identifiers.

7. The method according to claim 1, wherein queuing the packets comprises identifying an Address Resolution Protocol (ARP) packet that duplicates another ARP packet that is already queued, and discarding the identified ARP packet.

8. The method according to claim 1, wherein queuing the packets comprises identifying a TCP packet that is a retransmission of another TCP packet that is already queued, and discarding the identified TCP packet.

9. The method according to claim 1, wherein aggregating the queued packets comprises, in response to identifying a TCP packet that is a retransmission of another TCP packet that is already queued, terminating aggregation of the packets into a current TCP segment and sending the current TCP segment to the second compute node.

10. The method according to claim 5, wherein deciding to terminate the aggregation comprises constraining a maximum delay incurred by queuing the packets.

11. The method according to claim 5, wherein deciding to terminate the aggregation comprises constraining a maximum total data volume of the queued packets.

12. The method according to claim 6, wherein querying the mapping comprises extracting destination MAC addresses from the packets generated in the first compute node, and selecting, using the mapping, the packets whose destination MAC addresses are mapped to a compute-node identifier of the second compute node.

13. A method, comprising:
in a computing system that includes multiple compute nodes, which run workloads and are connected by a network, establishing a dedicated Transport Control Protocol (TCP) connection over the network between a first compute node and a second compute node;
in the first compute node, identifying and queuing packets that originate from one or more source workloads on the first compute node and are destined to one or more destination workloads on the second compute node;
aggregating the queued packets in the first compute node into one or more TCP segments, and sending the TCP segments over the dedicated TCP connection to the second compute node; and in the second compute node, receiving the TCP segments over the dedicated TCP connection, extracting the packets from the received TCP segments, and forwarding the extracted packets to the destination workloads,
wherein extracting the packets in the second compute node comprises, in response to identifying among the packets at least a predefined number of duplicate TCP acknowledgements belonging to a same TCP connection, delivering the duplicate TCP acknowledgements immediately to a respective destination workload.

14. The method according to claim 13, wherein aggregating the queued packets in the first compute node comprises, in response to identifying among the packets at least a predefined number of duplicate TCP acknowledgements belonging to a same TCP connection, terminating aggregation of the packets into a current TCP segment.

15. A compute node, comprising:
a Network Interface Controller (NIC) for communicating over a network; and
a Central Processing Unit (CPU), which is configured to run one or more source workloads, to establish a dedicated Transport Control Protocol (TCP) connection over the network with a peer compute node, to identify and queue packets that originate from the source workloads and are destined to one or more destination workloads on the peer compute node, and, in conjunction with the NIC, to aggregate the queued packets into one or more TCP segments and send the TCP segments over the dedicated TCP connection to the peer compute node,
wherein the CPU is configured, in response to identifying among the packets at least a predefined number of duplicate TCP acknowledgements belonging to a same TCP connection, to terminate aggregation of the packets into a current TCP segment.

* * * * *